(12) United States Patent  
Shaffer (10) Patent No.: US 9,242,195 B2
(45) Date of Patent: Jan. 26, 2016

(54) WATER FILTER WITH FEATURES FOR REDUCED SPILLING

(71) Applicant: General Electric Company, Schenectady, NY (US)

(72) Inventor: Timothy Scott Shaffer, LaGrange, KY (US)

(73) Assignee: General Electric Company, Schenectady, NY (US)

(*) Notice: Subject to any disclaimer, the term of this patent is extended or adjusted under 35 U.S.C. 154(b) by 315 days.

(21) Appl. No.: 13/688,664

(22) Filed: Nov. 29, 2012

(65) Prior Publication Data

US 2014/0144172 A1     May 29, 2014

(51) Int. Cl.
*B01D 35/157*     (2006.01)
*B01D 35/14*     (2006.01)
*B01D 35/00*     (2006.01)

(52) U.S. Cl.
CPC ............ *B01D 35/1573* (2013.01); *B01D 35/14* (2013.01); *B01D 35/157* (2013.01); *B01D 2201/30* (2013.01); *B01D 2201/302* (2013.01)

(58) Field of Classification Search
CPC .. B01D 35/1573; B01D 35/157; B01D 35/14; B01D 35/00
USPC ............................... 210/136, 97; 62/318, 317
See application file for complete search history.

(56) References Cited

U.S. PATENT DOCUMENTS

| | | | |
|---|---|---|---|
| 6,632,355 B2 | 10/2003 | Fritze | |
| 6,966,986 B1* | 11/2005 | Lackey | 210/234 |
| 7,506,666 B2* | 3/2009 | Tubby et al. | 138/40 |
| 2003/0042191 A1* | 3/2003 | Nam | B01D 35/147 210/234 |
| 2003/0042192 A1* | 3/2003 | Nam | B01D 35/1573 210/249 |
| 2006/0124532 A1* | 6/2006 | Magnusson et al. | 210/420 |

* cited by examiner

*Primary Examiner* — Christine T Mui
(74) *Attorney, Agent, or Firm* — Dority & Manning, P.A.

(57) ABSTRACT

A water filter is provided. The water filter includes a check valve positioned at an opening of a casing. The check valve regulates a flow of liquid through the opening of the casing. By regulating the flow of liquid, the check valve can hinder spilling of liquid contained within the water filter during removal or replacement of the water filter.

20 Claims, 7 Drawing Sheets

WATER FILTER WITH FEATURES FOR REDUCED SPILLING

FIELD OF THE INVENTION

The present subject matter relates generally to water filters.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filtering media such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filtering media has not exceeded its filtering capacity, the water filter is preferably replaced or serviced about every six months regardless of its current performance. However, changing the water filter can be a messy and time consuming task. For example, when the water filter is removed it is filled with water, and such water can spill if the water filter is tipped or tilted during removal. However, tipping or tilting certain water filters can be required in order to remove certain water filters due to their location. Such spills can be time consuming and inconvenient to clean. Thus, certain consumers only replace the water filter after it has become blocked, e.g., by sediment accumulation around and within the carbon block.

Accordingly, a water filter with features for hindering spilling of water contained within the water filter during removal or replacement of the water filter would be useful.

BRIEF DESCRIPTION OF THE INVENTION

The present subject matter provides a water filter. The water filter includes a check valve positioned at an opening of a casing. The check valve regulates a flow of liquid through the opening of the casing. By regulating the flow of liquid, the check valve can hinder spilling of liquid contained within the water filter during removal or replacement of the water filter. Additional aspects and advantages of the invention will be set forth in part in the following description, or may be apparent from the description, or may be learned through practice of the invention.

In a first exemplary embodiment, a water filter is provided. The water filter includes a casing that defines a chamber for receipt of water to be filtered and an opening that provides access to the chamber of the casing. A filtering media is disposed within the chamber of the casing for filtering a flow of water through the chamber of the casing. A check valve is mounted to the casing at the opening of the casing. The check valve is configured for regulating the flow of liquid through the chamber of the casing.

In a second exemplary embodiment, a refrigerator appliance is provided. The refrigerator appliance includes a cabinet that defines a chilled compartment for receipt of food items for storage. A water filter is mounted to the cabinet. The water filter includes a casing that defines a chamber for receipt of water to be filtered and an opening that provides access to the chamber of the casing. A filtering media is disposed within the chamber of the casing for filtering a flow of water through the chamber of the casing. A check valve is mounted to the casing at the opening of the casing. The check valve is configured for regulating the flow of liquid through the chamber of the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
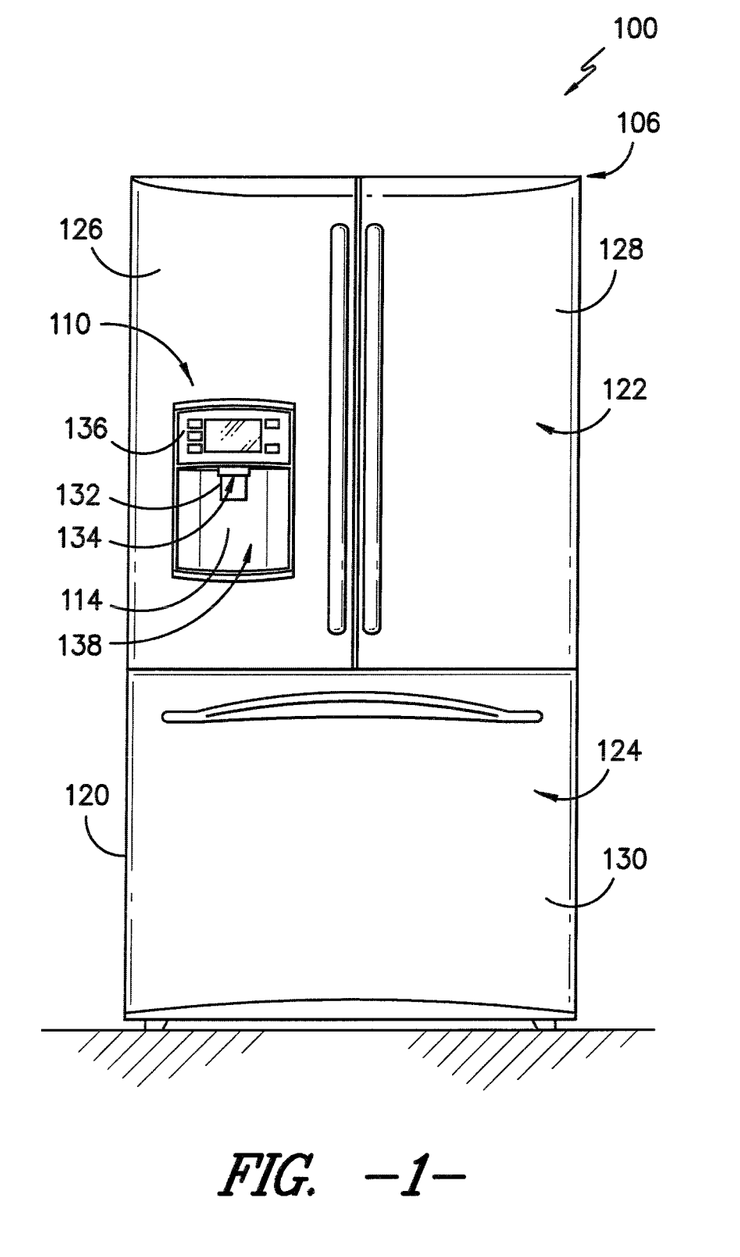
FIG. 1 provides a front view of a refrigerator appliance according to an exemplary embodiment of the present subject matter.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides). Consequently, the description set forth herein is for illustrative purposes only and is not intended to limit the present subject matter in any aspect.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

Figure 2:
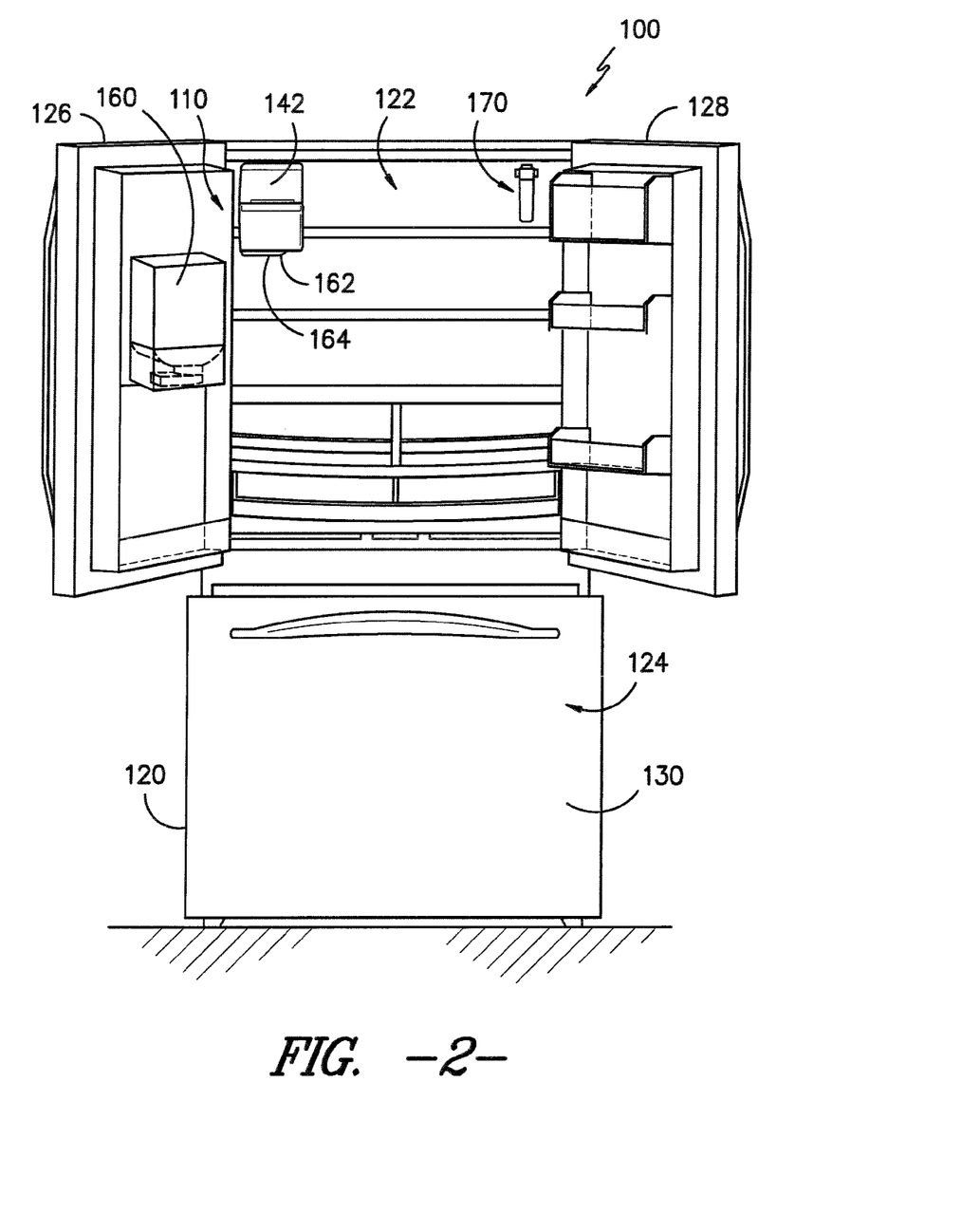
FIG. 2 provides a front view of the refrigerator appliance of FIG. 1 with refrigerator doors of the refrigerator appliance shown in an open configuration to reveal a fresh food chamber of the refrigerator appliance.

FIG. 2 is a perspective view of refrigerator appliance 100 having refrigerator doors 126, 128 in an open position to reveal the interior of fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

Operation of the refrigerator appliance 100 is regulated by a controller (not shown) that is operatively coupled to user interface panel 136 and/or activation member 132 (shown in FIG. 1). Panel 136 provides selections for user manipulation of the operation of refrigerator appliance 100 such as e.g., selections between whole or crushed ice, chilled water, and/or other options as well. In response to user manipulation of the user interface panel 136, the controller operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout refrigerator appliance 100. For example, the controller may be located within beneath the user interface panel 136 on door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller via one or more signal lines or shared communication busses.

Refrigerator appliance 100 also includes a water filtering assembly 170 for filtering water coming into refrigerator appliance 100 from a water supply (not shown) such as a municipal water source or a well. Water filtering assembly 170 can remove contaminants such as chlorine, chloroform, lead, arsenic, pharmaceuticals, microbes, and/or other undesirable substances from water supplied to refrigerator appliance 100. In particular, water filtering assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Figure 3:
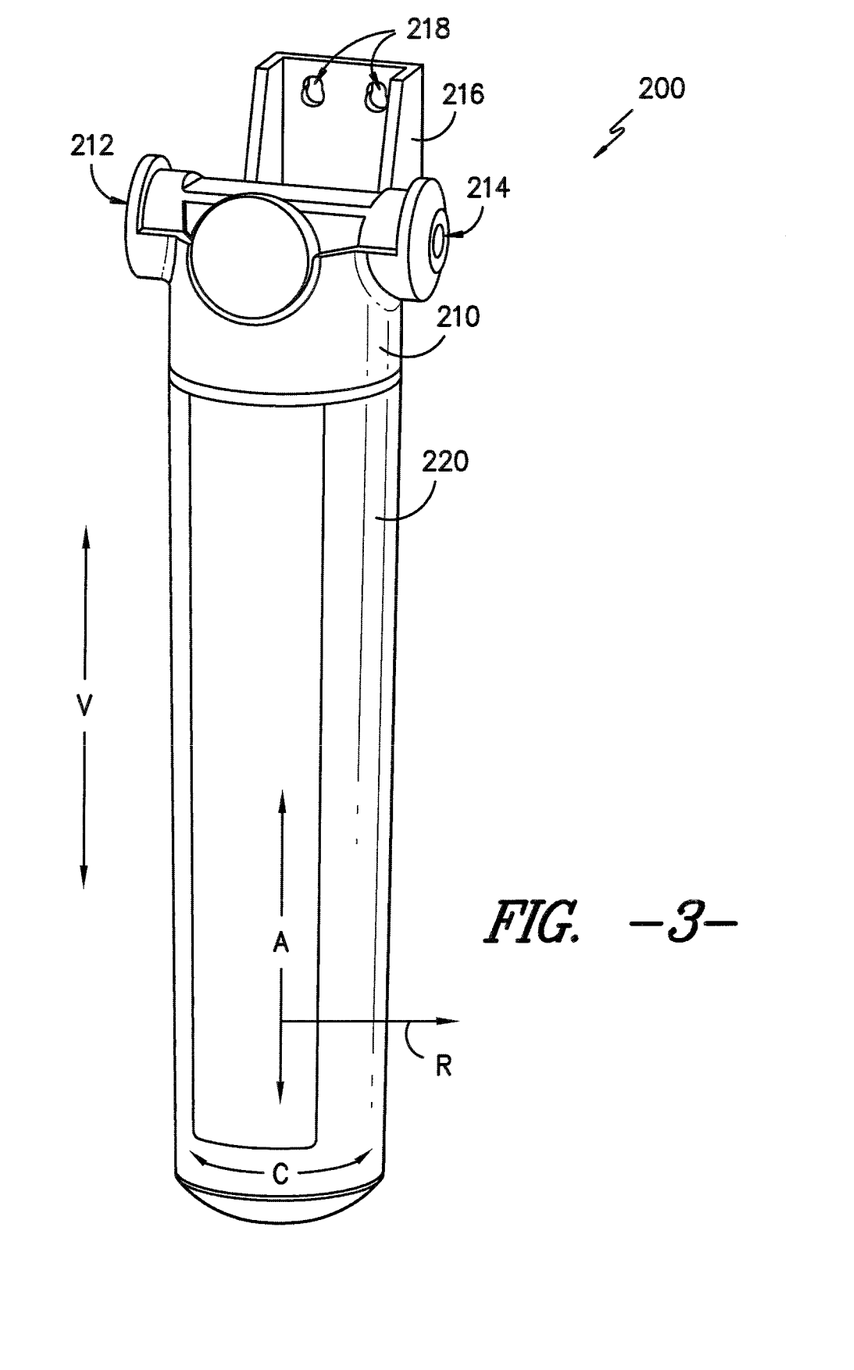
FIG. 3 provides a perspective view of a water filtering assembly according to an exemplary embodiment of the present subject matter. The water filtering assembly includes a water filter and a manifold.

FIG. 3 provides a perspective view of a water filtering assembly 200 according to an exemplary embodiment of the present subject matter. Water filtering assembly 200 may be used in the refrigerator appliance 100, e.g., as water filtering assembly 170 (FIG. 2). In alternative exemplary embodiments, water filtering assembly 200 may be used in any other suitable appliance such as an ice maker, as a point of use water filtration system, e.g., installed beneath a sink, or as a point of entry water filtration system for an entire household.

Water filtering assembly 200 defines an axial direction A, a radial direction R, and a circumferential direction C. Water filtering assembly 200 also includes a manifold 210 and a water filter 220 removably mounted to manifold 210. Manifold 210 includes a mounting bracket 216 that defines holes 218. Fasteners (not shown) such as nails, pegs, tabs, screws, or bolts may be inserted through holes 218 to mount water filtering system 200, e.g., to housing 120 of refrigerator appliance 100 (FIG. 2), to a kitchen cabinet beneath a kitchen sink, or to a wall within a house. Manifold 210 also defines an entrance 212 and an exit 214. Entrance 212 may be in fluid communication with a water supply and receive unfiltered water from the water supply. From entrance 212, such unfiltered water is directed into water filter 220. Such unfiltered water passes through water filter 220 and exits manifold 210 at exit 214 as filtered water. Such filtered water may, e.g., be directed to the ice maker within insulated housing 142 (FIG. 2), discharging outlet 134 (FIG. 2), a kitchen sink faucet, and/or any other suitable use.

Figure 4:
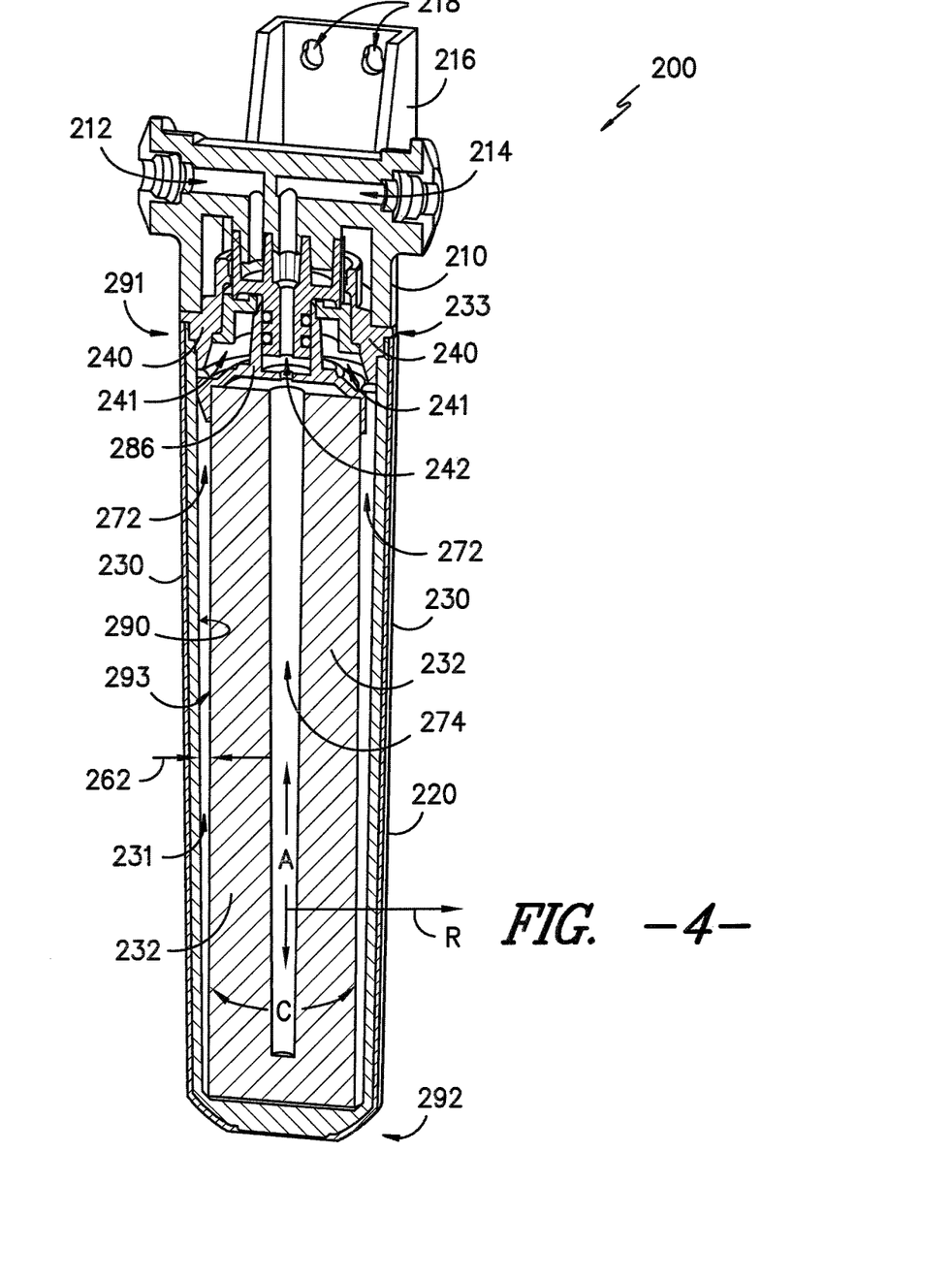
FIG. 4 provides a section view of the water filtering assembly of FIG. 3.

FIG. 4 provides a section view of water filtering assembly 200. Water filter 220 of water filtering assembly 200 includes a casing 230 that defines a chamber 231. Casing 230 also extends between a top portion 291 and a bottom portion 292, e.g., along the axial direction A. Casing 230 also defines an opening 233 at top portion 291 of casing 230. Opening 233 permits access to chamber 231 of casing 230.

A cap 240 is mounted to casing 230 at opening 233 of casing 230. Cap 240 defines an inlet 241 and an outlet 242. Inlet 241 is in fluid communication with entrance 212 of manifold 210 and with chamber 231 of casing 230. Thus, unfiltered water can enter chamber 231 of casing 230 through inlet 241 of cap 240. Outlet 242 of cap 240 is in fluid communication with exit 214 of manifold 210 and chamber 231 of casing 230. Thus, filtered water can exit chamber 231 of casing 230 through outlet 242 of cap 240.

A filtering media 232 is disposed within chamber 231. Filtering media 232 is spaced apart from an inner surface 290 of casing 230, e.g., along the radial direction R. In particular, a brace 286 positioned within chamber 231 adjacent cap 240 supports filtering media 232 at top portion 291 of casing 240 in order to define a gap 262 between inner surface 290 of casing 230 and an outer surface 293 of filtering media 232. As an example, brace 286 may be glued or in some other manner fixed to filtering media 232 in order to define gap 262, position filtering media 232 vertically, and block potential bypass flow between filtering media 232 and outlet 242 of cap 240.

Filtering media 232 also divides chamber 231 into an unfiltered volume 272 and a filtered volume 274. Filtering media 232 can remove impurities and contaminants from water passing through filtering media 232 from unfiltered volume 272 to filtered volume 274. Filtering media 232 may include any suitable mechanism for filtering water such as, e.g., ceramic filters, activated carbon filters, polymer filters, or reverse osmosis filters.

As used herein, the term "unfiltered" describes a volume within chamber 231 that is not filtered relative to filtering media 232. However, as will be understood by those skilled in the art, water filtering assembly 200 may include additional filters that filter water entering chamber 231. Thus, "unfiltered volume" may be filtered relative to other filters but not filtering media 232.

As an example, water passing though water filtering assembly 200 can follow a path through water filtering assembly 200. In particular, unfiltered water can enter water filtering assembly 200 through entrance 212 of manifold 210. Such unfiltered water can then flow though inlet 241 of cap 240 into unfiltered volume 272 of chamber 231. Such unfiltered water can pass though filtering media 232 to remove impurities and can exit filtering media 232 into filtered volume 274 of chamber 231 as filtered water. Such filtered water can then pass through outlet 242 of cap 240 and exit water filtering assembly 200 through exit 214 of manifold 210.

In such a manner, unfiltered water can follow the path through water filtering assembly 200. In particular, unfiltered water can pass though filtering media 232, and filtered water can exit water filtering assembly 200. Such filtering can improve taste and/or safety of water. However, as will be understood by those skilled in the art, effectiveness of filtering media 232 can decrease over time. In particular, bacteria can accumulate or grow within filtering media 232 over time. Thus, filtering media 232 and/or water filter 220 may require changing after a certain time interval in order to maintain proper operation of water filtering assembly 200. In particular, filtering media 232 and/or water filter 220 may require changing about every six months. Water filtering assembly 200 includes features for assisting replacement of water filter 220. In particular, water filter 220 includes features for hindering spilling of water contained within water filter 220 during removal or replacement of water filter 220 from water filtering assembly 200.

Figure 5:
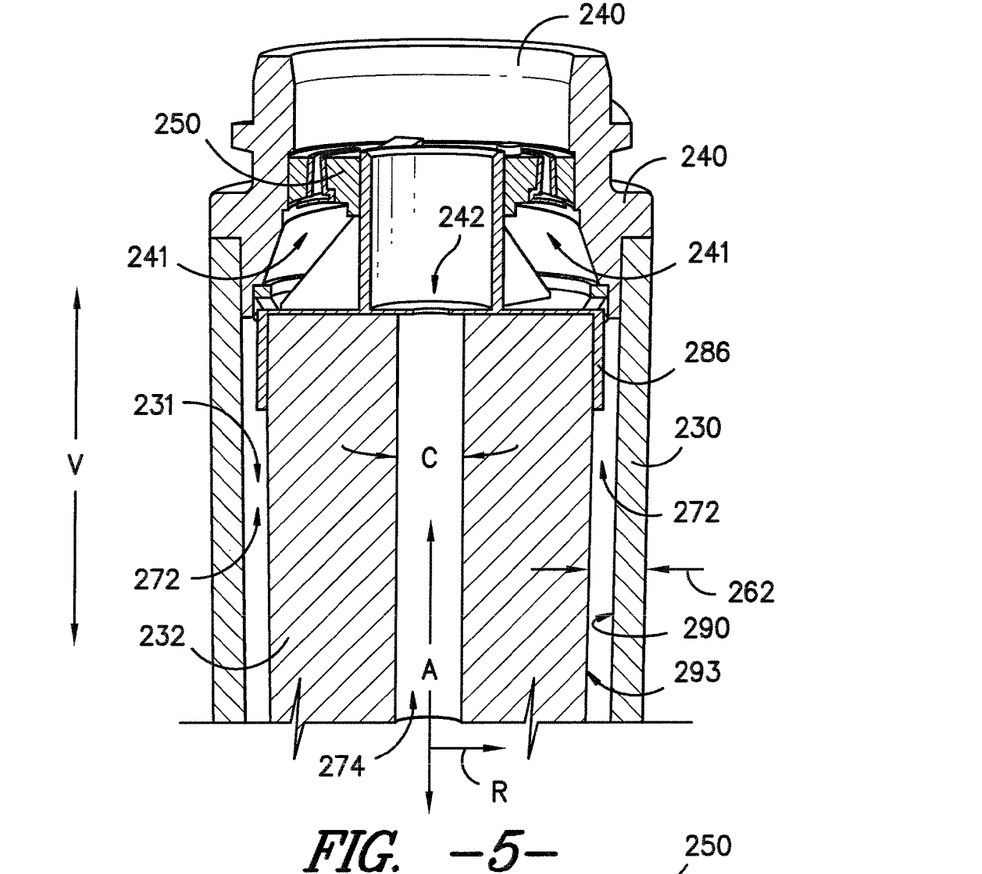
FIG. 5 is a partial, section view of the water filter of FIG. 3. The water filter includes a check valve according to an exemplary embodiment of the present subject matter.

FIG. 5 is a partial, section view of water filter 220. Water filter 220 includes a check valve assembly 250. Check valve assembly 250 is mounted at opening 233 (FIG. 4) of casing 230 in order to regulate a flow of water through opening 233 of casing 230, e.g., into and out of chamber 231 of casing 230. In particular, check valve assembly 250 is mounted at inlet 241 of cap 240 in order to regulate a flow of water through inlet 241 of cap 240, e.g., into and out of unfiltered volume 272 of chamber 231. However, in alternative exemplary embodiments, check valve assembly 250 or an additional check valve (not shown) may be mounted at outlet 242 of cap 240 in order to regulate a flow of water through outlet 242 of cap 240, e.g., into and out of filtered volume 274 of chamber 231.

Check valve assembly 250 includes features for hindering spilling of water contained within water filter 220 during removal or replacement of water filter 220 from water filtering assembly 200. In particular, check valve assembly 250 is configured for permitting water to flow into chamber 231 through check valve assembly 250 and hindering water from flowing out of chamber 231 through check valve assembly 250. Thus, check valve assembly 250 can act as a one-way valve. By hindering water from flowing out of chamber 231 through check valve assembly 250, check valve assembly 250 can limit or hinder water from spilling during removal of water filter 220 from water filtering assembly 200. Check valve assembly 250 is discussed in greater detail below.

Figure 6:
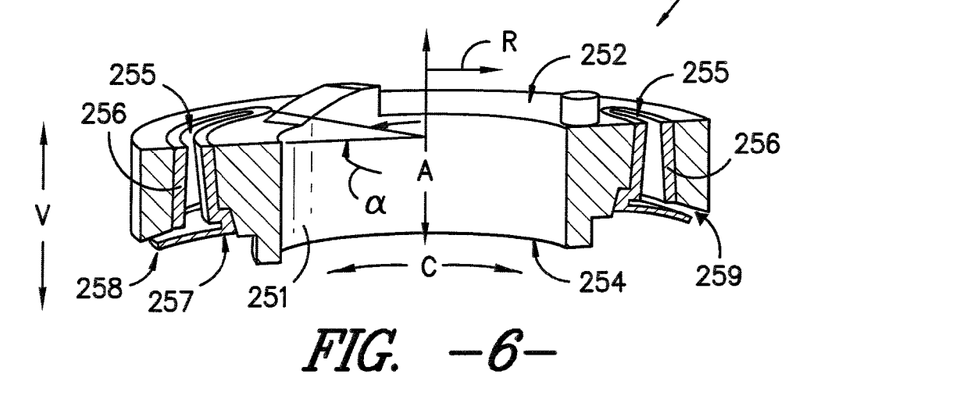
FIG. 6 is a partial, section view of the check valve removed from the water filter of FIG. 5.

FIG. 6 is a partial, section view of check valve assembly 250 removed from water filter 220. Check valve assembly 250 includes an annular body 251. Annular body 251 may be constructed of any suitable material, e.g., a plastic such as polyvinyl chloride. Annular body 251 has a top surface 252 and a bottom surface 254. Top surface 252 is positioned opposite bottom surface 254 such that top and bottom surfaces 252 and 254 are spaced apart, e.g., along a vertical direction V or axial direction A. Annular body 251 also defines passages 255. Passages 255 extend through annular body 251 from top surface 252 to bottom surface 254. Passages 255 permit a flow of water through annular body 251. In the exemplary embodiment shown in FIG. 6, annular body 251 defines two passages. However, in alternative exemplary embodiments, annular body 251 may define any suitable number of passages, e.g., one, three, four, five, six, or more passages.

Figure 8:
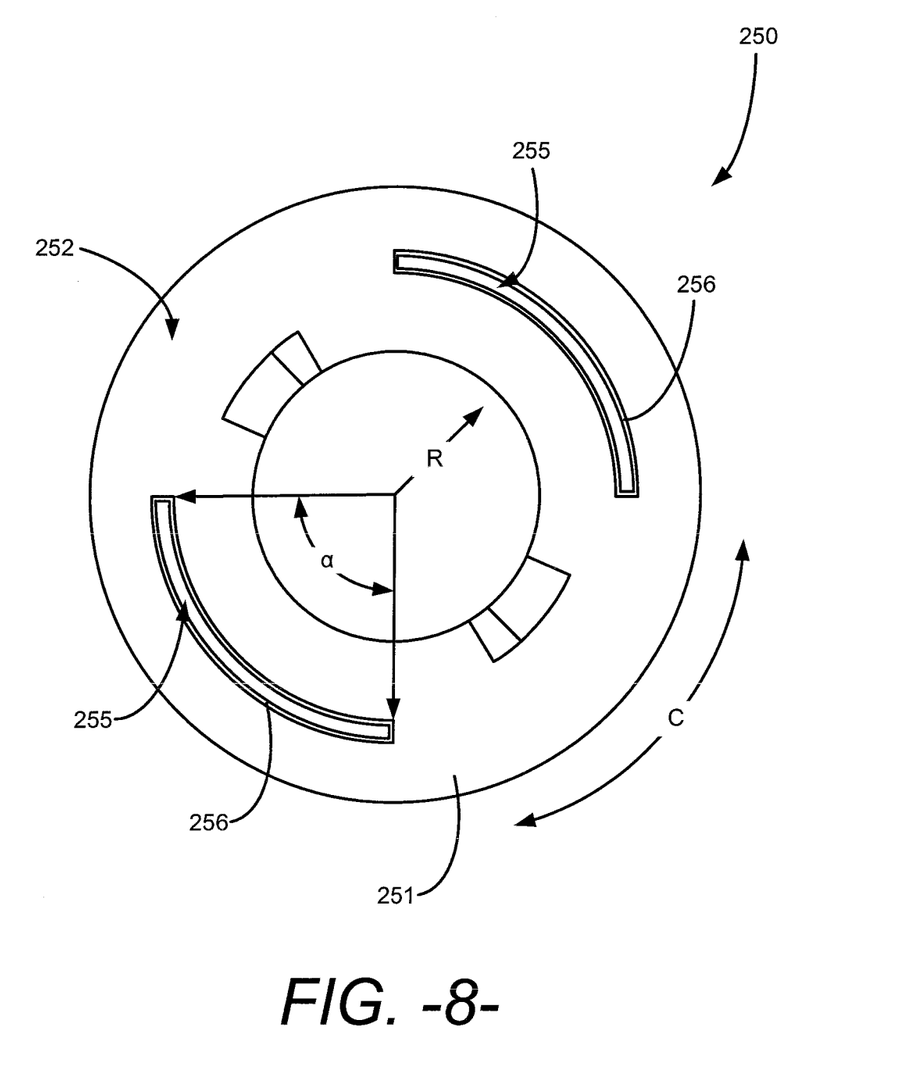
FIG. 8 is a top, plan view of the check valve removed from the water filter of FIG. 5.

Passages 255 of annular body 251 extend along the circumferential direction C. Thus, passages 255 are substantially arcuate, e.g., in a plane that is perpendicular to the axial direction A or vertical direction V. In the exemplary embodiment shown in FIG. 6, passages 255 extend about the circumferential direction C, e.g., in the plane that is perpendicular to the axial direction A or vertical direction V, in an amount that can be described by a central angle α as shown in FIG. 8, where angle α is about ninety degrees. However, in alternative exemplary embodiments, central angle α may be any suitable angle. For example, angle α may be between about twenty degrees and about one hundred and sixty degrees, between about twenty degrees and about one hundred and twenty degrees, or between about twenty degrees and about eighty degrees.

Flaps 256 are mounted to annular body 251. In particular, flaps 256 are received within passages 255 in order to mount flaps 256 to annular body 251. Flaps 256 are constructed of an elastomeric material such as a rubber. Thus, flaps 256 are flexible. In particular, flaps 256 include a proximal portion 257 that is secured to annular body 251 on bottom surface 254 of annular body 251 at passages 255. Thus, proximal portion 257 is static relative to annular body 251.

Flaps 256 also include a distal portion 258 that is spaced apart from proximal portion 257, e.g., along the radial direction R. Distal portion 258 is moveable or flexible relative to annular body 251 such that distal portion 258 can move, e.g., along the axial direction A, relative to annular body 251. In particular, flaps 256 function as a check valve such that flaps 256 hinder or obstruct a flow of water through passages 255 when distal portion 258 of flaps 256 is positioned on bottom surface 254 of annular body 251. Conversely, flaps 256 assist with defining spaces 259 when distal portion 258 of flaps 256 is spaced apart from bottom surface 254 of annular body 251, e.g., along the axial direction A. Water can flow through spaces 259 when distal portion 258 of flaps 256 is spaced apart from bottom surface 254 of annular body 251. Thus, flaps 256 are configured for regulating a flow of water through passages 255 and into chamber 231.

As an example, water can enter passages 255 at top surface 252 of annular body 251. Such water can flow through passages 255 to bottom surface 254 of annular body 251 and exit passages 255 at spaces 259 because the flow of water through passages 255 urges distal portion 258 of flaps 256 away from bottom surface 254. Conversely, if water is urged into passages 255 at bottom surface 254, such water will impact flaps 256 and urge distal portion 258 of flaps 256 against bottom surface 254 of annular body 251. With distal portion 258 of flaps 256 positioned on bottom surface 254, water is hindered from flowing through passages 255 by flaps 256. In such a manner, flaps 256 can assist with hindering water from flowing out of cavity 231, e.g., during removal of water filter 220 from water filtering assembly 200 such as during a replacement of water filter 220.

Figure 7:
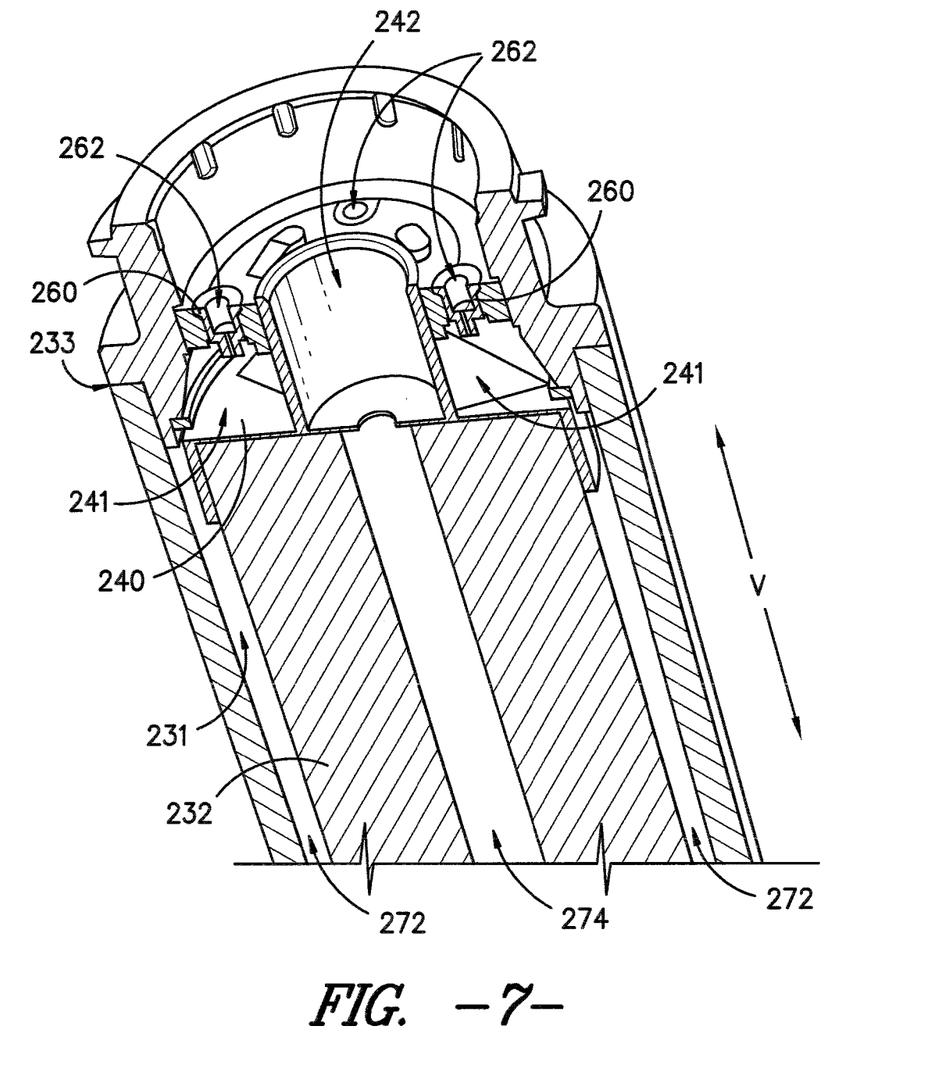
FIG. 7 is a partial, section view of the water filter of FIG. 3. The water filter includes a check valve according to an additional exemplary embodiment of the present subject matter.

FIG. 7 is a partial, section view of water filter 220. In FIG. 7, check valve assembly 250 includes duck bill valves 260 positioned at passages 262 rather than flaps 256 (FIG. 6). Thus, in the exemplary embodiment shown in FIG. 7, duck bill valves 260 function as a check valve rather than flaps 256 (FIG. 6) to regulate the flow of water through water filter 220. In the exemplary embodiment shown in FIG. 7, passages 262 are substantially circular rather than annular as with passages 255 (FIG. 6). Like flaps 256, duck bill valves 260 regulate a flow of water through water filter 220. Thus, as an example, duck bill valves 260 permit water to flow through passages 262 from top surface 252 to bottom surface 254. But, duck bill valves 260 hinder water from flowing through passages 262 from bottom surface 254 to top surface 252.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter comprising:
   a casing that defines a chamber for receipt of water to be filtered and an opening that provides access to the chamber of said casing, said casing configured for selective mounting to a manifold;
   a filtering media disposed within the chamber of said casing for filtering a flow of water through the chamber of said casing;
   a check valve positioned on and mounted to said casing at the opening of said casing, said check valve configured for blocking water flow from the chamber of said casing at the opening of said casing when said casing is not mounted to the manifold.

2. The water filter of claim 1, further comprising a cap, said cap mounted to said casing at the opening of said casing, said cap defining an inlet and an outlet, the inlet of said cap permitting a flow of water into the chamber of said casing, the outlet of said cap permitting a flow of water out of the chamber of said casing, said check valve mounted to said cap at the inlet of said cap.

3. The water filter of claim 1, wherein the water filter defines an axial direction, wherein said check valve comprises an annular body having a top surface and a bottom surface positioned opposite the top surface, said annular body also defining a passage that extends from the top surface of said annular body to the bottom surface of said annular body along the axial direction.

4. The water filter of claim 3, wherein the water filter further defines a circumferential direction, the passage of said annular body extending along the circumferential direction such that the passage of said annular body is substantially arcuate.

5. The water filter of claim 4, wherein the passage of said annular body has a central angle greater than about twenty degrees.

6. The water filter of claim 3, wherein said check valve further comprises a duckbill valve positioned at the passage of said annular body.

7. The water filter of claim 3, wherein said check valve further comprises a flap positioned on the bottom surface of said annular body at the passage of said annular body.

8. The water filter of claim 7, wherein said flap is constructed of an elastomeric material.

9. The water filter of claim 7, wherein said flap has a proximal portion secured to said annular body and a distal portion that is movable along the axial direction relative to said annular body in order to regulate the flow of water through the opening of said casing.

10. The water filter of claim 1, wherein said filtering media comprises activated carbon or a reverse osmosis membrane.

11. A refrigerator appliance comprising:
- a cabinet that defines a chilled compartment for receipt of food items for storage;
- a manifold mounted to said cabinet;
- a water filter mounted to said cabinet, said water filter comprising:
  - a casing that defines a chamber for receipt of water to be filtered and an opening that provides access to the chamber of said casing, said casing configured for selective mounting to said manifold;
  - a filtering media disposed within the chamber of said casing for filtering a flow of water through the chamber of said casing;
  - a check valve positioned on and mounted to said casing at the opening of said casing, said check valve configured for blocking water flow from the chamber of said casing at the opening of said casing when said casing is not mounted to said manifold.

12. The refrigerator appliance of claim 11, further comprising a cap, said cap mounted to said casing at the opening of said casing, said cap defining an inlet and an outlet, the inlet of said cap permitting a flow of water into the chamber of said casing, the outlet of said cap permitting a flow of water out of the chamber of said casing, said check valve mounted to said cap at the inlet of said cap in order to hinder the flow of water from exiting the chamber of said casing through the inlet of said cap.

13. The refrigerator appliance of claim 11, wherein the water filter defines an axial direction, wherein said check valve comprises an annular body having a top surface and a bottom surface positioned opposite the top surface, said annular body also defining a passage that extends from the top surface of said annular body to the bottom surface of said annular body along the axial direction.

14. The refrigerator appliance of claim 13, wherein the water filter further defines a circumferential direction, the passage of said annular body extending along the circumferential direction such that the passage is substantially arcuate.

15. The refrigerator appliance of claim 14, wherein the passage of said annular body has a central angle greater than about twenty degrees.

16. The refrigerator appliance of claim 13, wherein said check valve further comprises a duckbill valve positioned at the passage of said annular body.

17. The refrigerator appliance of claim 13, wherein said check valve further comprises a flap positioned on the bottom surface of said annular body at the passage of said annular body.

18. The refrigerator appliance of claim 17, wherein said flap is constructed of an elastomeric material.

19. The refrigerator appliance of claim 17, wherein said flap has a proximal portion secured to said annular body and a distal portion that is movable along the axial direction relative to said annular body in order to regulate the flow of water through the opening of said casing.

20. The refrigerator appliance of claim 11, wherein said filtering media comprises activated carbon or a reverse osmosis membrane.

* * * * *